United States Patent
Ma et al.

(10) Patent No.: US 11,287,936 B2
(45) Date of Patent: Mar. 29, 2022

(54) TOUCH DISPLAY PANEL AND TOUCH DISPLAY DEVICE

(71) Applicant: Yungu (Gu'an) Technology Co., Ltd., Langfang (CN)

(72) Inventors: Junyuan Ma, Jiangsu (CN); Bing Wang, Jiangsu (CN); Chengming Zhang, Jiangsu (CN); Kun Zhu, Jiangsu (CN); Jiading Liu, Jiangsu (CN); Peng Xu, Jiangsu (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 493 days.

(21) Appl. No.: 16/345,928

(22) PCT Filed: Jul. 25, 2018

(86) PCT No.: PCT/CN2018/096966
§ 371 (c)(1),
(2) Date: Apr. 29, 2019

(87) PCT Pub. No.: WO2019/105050
PCT Pub. Date: Jun. 6, 2019

(65) Prior Publication Data
US 2021/0373710 A1    Dec. 2, 2021

(30) Foreign Application Priority Data

Nov. 30, 2017 (CN) .................. 201721643601.X
Nov. 30, 2017 (CN) .................. 201721646677.8

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| 2006/0124972 | A1* | 6/2006 | Booth | H01L 23/5223 257/222 |
| 2019/0258343 | A1* | 8/2019 | Hwang | G06F 3/0445 |

FOREIGN PATENT DOCUMENTS

| CN | 201622554 U | 11/2010 |
| CN | 102541378 A | 7/2012 |

(Continued)

OTHER PUBLICATIONS

CN 106293202 A _ Espacenet English Abstract.
(Continued)

*Primary Examiner* — Deeprose Subedi
(74) *Attorney, Agent, or Firm* — Ladas & Parry LLP

(57) ABSTRACT

The disclosure discloses a touch display panel and a touch display device. The touch display panel includes a cathode and a number of touch electrodes, wherein an interior of at least one touch electrode is hollowed out to reduce a relative area between the cathode and the touch electrode. The relative area between the touch electrode and the cathode of the touch display panel may be reduced by hollowing out the interior of at least one touch electrode, thereby reducing the inductive capacitance between the touch electrode and the cathode.

20 Claims, 6 Drawing Sheets

(56) References Cited

FOREIGN PATENT DOCUMENTS

| | | |
|---|---|---|
| CN | 202711217 U | 1/2013 |
| CN | 202711219 U | 1/2013 |
| CN | 103105986 A | 5/2013 |
| CN | 205721703 U | 11/2016 |
| CN | 106293202 A | 1/2017 |
| CN | 207833470 U | 9/2018 |
| CN | 207924637 U | 9/2018 |

OTHER PUBLICATIONS

International Search Report in International Application No. PCT/CN2018/096966.
Written Opinion of the International Search Authority in International Application No. PCT/CN2018/096966.
CN 102541378 A _ Machine English Translation.
CN 201622554 U _ English_Abstract.
CN 202711217 U _ English_Abstract.
CN 103105986 A _ English_Abstract.
CN 202711219 U _ English_Abstract.
CN 207833470 U _ English_Abstract.
CN 207924637 U _ English_Abstract.
CN 205721703U _ Espacenet English Abstract.

* cited by examiner

TOUCH DISPLAY PANEL AND TOUCH DISPLAY DEVICE

RELATED APPLICATION

This application is an application under 35 U.S.C. 371 of International Application No. PCT/CN2018/096966 filed on 25 Jul. 2018. This application claims priority from Chinese Patent Applications Nos. 201721643601.X filed on Nov. 30, 2017 and 201721646677.8 filed on Nov. 30, 2017, the coments of which should be understood to be incorporated herein by reference.

FIELD OF THE DISCLOSURE

The disclosure relates to the field of display technology, and more particularly to a touch display panel and a touch display device.

BACKGROUND

A touch display panel integrates a touch screen with a flat display panel to enable a flat display panel with a touch function. Generally, the touch display panel may provide a human-computer interaction interface, and allows an input to be performed by a finger, a stylus, etc., so that its application is more direct and more user-friendly. With the development of display technologies, the touch display panel is increasingly used in various display devices.

With the development of the thinning of the touch display panel, the thickness of the touch display panel gets thinner and thinner. For a cathode and a touch electrode in the touch display panel, the distance between them is coming closer. However, in practical applications, since the distance between the cathode and the touch electrode is relatively closer, when touching the touch display panel, the cathode may interfere with the touch electrode, resulting in the touch display panel having a reduced touch sensitivity and the touch display panel having a damaged or even disabled touch function.

SUMMARY

The main purpose of the disclosure is to provide a touch display panel and a touch display device, which aim to solve the problem of the effect on the touch function of the touch display panel in the existing touch display panel, which is caused by great interference with the touch electrode by the cathode due to the closer distance between the cathode and the touch electrode.

To solve the above purpose, embodiments of the disclosure provide a touch display panel, including: a cathode and a plurality of touch electrodes, wherein, an interior of at least one touch electrode is hollowed out to reduce a relative area between the touch electrode and the cathode.

Optionally, the touch electrodes comprise a plurality of inductive electrodes, and an interior of at least one inductive electrode is hollowed out to reduce a relative area between the inductive electrode and the cathode.

Optionally, each inductive electrode comprises a plurality of sequentially connected inductive sub-electrodes;

an interior of one or more inductive sub-electrodes comprised in the at least one inductive electrode is hollowed out.

Optionally, the touch electrodes further comprise a plurality of drive electrodes, and an interior of at least one drive electrode is hollowed out to reduce a relative area between the drive electrode and the cathode.

Optionally, each drive electrode comprises a plurality of sequentially connected drive sub-electrodes;

an interior of one or more drive sub-electrodes comprised in the at least one drive electrode is hollowed out.

Optionally, the plurality of inductive electrodes and the plurality of drive electrodes are located in a same electrically conductive layer; or the plurality or inductive electrodes and the plurality of drive electrodes are located in different electrically conductive layers.

Optionally, the plurality of inductive electrodes and the plurality of drive electrodes are intersected with each other, and the adjacent drive sub-electrodes and the inductive sub-electrodes are nested with each other.

Optionally, the plurality of inductive electrodes comprise at least one electrode region intersected with the drive electrode, and the electrode region comprises a bridge for connecting the plurality of inductive sub-electrodes.

Optionally, the adjacent drive sub-electrodes and the inductive sub-electrodes being nested with each other comprises:

a side of the drive sub-electrode and a side of the adjacent inductive sub-electrode respectively have a concave-convex structure, and shape of the concave-convex structure of the drive sub-electrode and shape of the concave-convex structure of the adjacent inductive sub-electrode being consistent and matched with each other.

Optionally, the adjacent drive sub-electrodes and the inductive sub-electrodes being nested with each other comprises:

a side of the drive sub-electrode and a side of the adjacent inductive sub-electrode respectively have a spiral structure, and shape of the spiral structure of the drive sub-electrode and shape of the spiral structure of the adjacent inductive sub-electrode being consistent and matched with each other.

Optionally, the plurality of inductive sub-electrodes of each inductive electrode are connected by a first electrically conductive bridge;

the plurality of drive sub-electrodes of each drive electrode are connected by a second electrically conductive bridge.

Optionally, the plurality of inductive electrodes and the first electrically conductive bridge are located in the same electrically conductive layer, and the plurality of drive electrodes and the second electrically conductive bridge are located in the same electrically conductive layer.

Optionally, the first electrically conductive bridge and the second electrically conductive bridge are insulated from each other.

Optionally, a shape of the inductive electrode comprises at least one of a diamond shape and a strip shape;

a shape of the drive electrode comprises at least one of a diamond shape and a strip shape.

Optionally, the inductive sub-electrode and the drive sub-electrode have a plurality of mesh units.

Optionally, the plurality of inductive electrodes and the plurality of drive electrodes are made from transparent electrically conductive materials or metal materials.

The above at least one technical solution adopted by the embodiments of the disclosure can achieve the following beneficial effects:

The embodiments of the disclosure provide a touch display panel and a touch display device, include a cathode and a plurality of touch electrodes, an interior of at least one touch electrode is hollowed out to reduce a relative area between the touch electrode and the cathode. In the embodiments of the disclosure, an interior of at least one touch electrode in the touch display panel is hollowed out to reduce a relative area between the touch electrode and the cathode in the touch display panel, thereby reducing the inductive capacitance between the touch electrodes and the cathode. In this way, when touching the touch display panel, owing to the reduced inductive capacitance between the cathode and the inductive electrode, compared with the prior art, the interference with the touch electrode by the cathode may be alleviated, thereby reducing the damage to the touch function of the touch display panel and improving the touch sensitivity of the touch display panel.

To achieve the above object, embodiments of the disclosure also provide a touch display panel, including: a drive electrode and an inductive electrode intersected with the drive electrode, wherein, the drive electrode comprises a plurality of mutually independent drive sub-electrodes, and the inductive electrode comprises a plurality of mutually independent touch inductive sub-electrodes;

the adjacent drive sub-electrodes and the inductive sub-electrodes are nested with each other.

Optionally, the adjacent drive sub-electrodes and the inductive sub-electrodes being nested with each other comprises:

a side of the drive sub-electrode and a side of the adjacent inductive sub-electrode respectively have a concave-convex structure, the concave-convex structure of the drive sub-electrode and the concave-convex structure of the adjacent inductive sub-electrode being matched with each other.

Optionally, the adjacent drive sub-electrodes and the inductive sub-electrodes being nested with each other comprises:

the drive sub-electrode and the adjacent inductive sub-electrode respectively have a spiral structure, and a spiral wall of the spiral structure of the drive sub-electrode being embedded in a gap between spiral walls of the spiral structure of the inductive sub-electrode.

The above at least one technical solution adopted by the embodiments of the disclosure can achieve the following beneficial effects:

In the touch display device provided by the embodiments of the disclosure, the drive sub-electrode and the inductive sub-electrode are nested with each other, so that the distance between the inductive electrode and the drive electrode is shortened and the relative area is increased, and the constant or increased mutual capacitance can be ensured by designing, thereby alleviating the interference by the cathode and achieving a higher touch sensitivity.

The embodiment of the disclosure further provides a touch display device, including any one of the touch display panels described above.

BRIEF DESCRIPTION OF THE DRAWINGS

In order to more clearly illustrate the embodiments of the disclosure or the technical solutions in the prior art, the drawings to be used in the embodiments or the description of the prior art will be briefly described below. It is apparent that the drawings in the following description are only some embodiment of the disclosure, and other drawings may be obtained according to the structures shown in the drawings by a person skilled in the art without paying any creative work.

Figure 1:
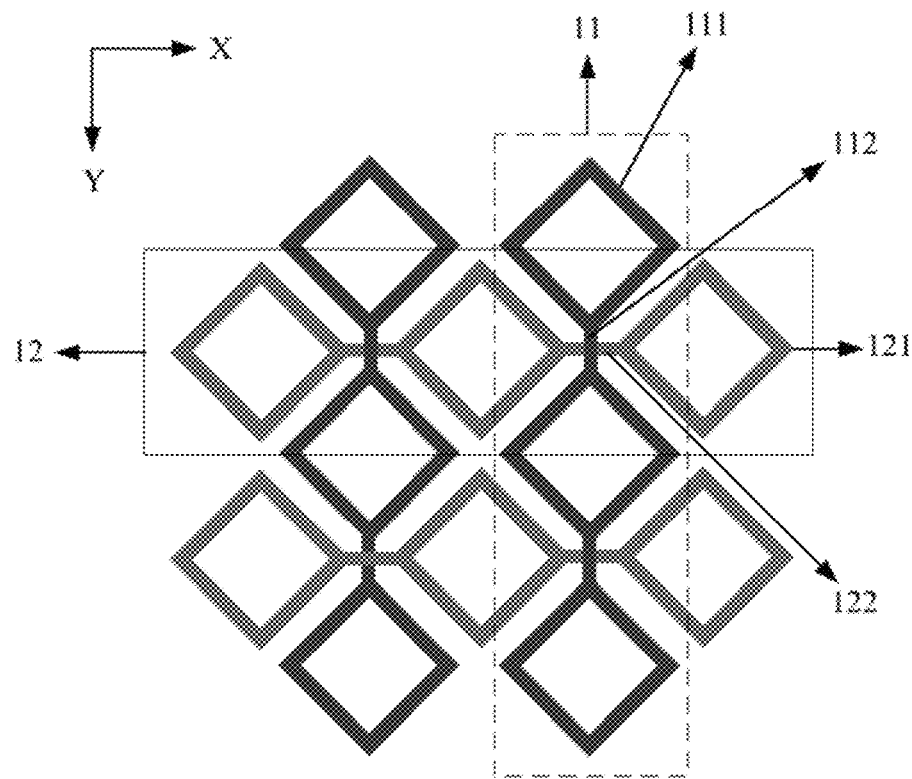
FIG. 1 is a schematic structural view of a touch display panel provided by an embodiment of the disclosure.

The implementation, functional features and advantages of the disclosure will be further described with reference to the accompanying drawings.

DETAILED DESCRIPTION OF PREFERRED EMBODIMENTS

In order to solve the above problems, embodiments of the disclosure provide a touch display panel and a touch display device. The touch display panel includes: a cathode and a plurality of touch electrodes, wherein an interior of at least one touch electrode is hollowed out to reduce a relative area between the cathode and the touch electrode. In embodiments of the disclosure, the relative area between the touch electrode and the cathode of the touch display panel may be reduced by hollowing out the interior of at least one touch electrode, thereby reducing the inductive capacitance between the touch electrode and the cathode. In this way, when touching the touch display panel, owing to the reduced inductive capacitance between the cathode and the touch electrode, compared with the prior art, the interference with the touch electrode by the cathode may be alleviated, thereby reducing the damage to the touch function of the touch display panel and improving the touch sensitivity of the touch display panel.

The technical solutions of the disclosure are clearly and completely described below in conjunction with the specific embodiments of the disclosure and the corresponding drawings. It is apparent that the described embodiments are merely part of the embodiments of the disclosure rather than all the embodiments. Based on the embodiments in the disclosure, all the other embodiments obtained by a person skilled in the art without paying creative work will fall into the protection scope of the disclosure.

In the embodiments of the disclosure, the main idea of improving the touch sensitivity of the touch display panel in the embodiments of the disclosure is that the relative area between the touch electrodes and the cathode may be reduced by partially hollowing out the area in the touch electrode of the touch display panel corresponding to the cathode, thereby reducing the inductive capacitance between the touch electrodes and the cathode. When touching the touch display panel, a larger change in capacitance may be detected by the touch electrode, thereby improving the touch sensitivity of the touch display panel.

The touch display panel provided by the embodiments of the disclosure may be an on-cell or an out-cell or an in-cell touch display panel. The touch display panel may be applied to various modes of the display panel, and is not specifically limited herein.

In the touch display panel provided by the embodiments of the disclosure, a plurality of inductive electrodes and a plurality of drive electrodes may be located in the same or different electrically conductive layer, wherein the plurality of inductive electrodes and the plurality of drive electrodes may be transparent and electrically conductive materials, including but not limited to ITO (Chinese name: 氧化铟锡, English name: Indium Tin Oxide); AgNW (silver nanowire), graphene, etc., or metal material such as metal mesh.

It should be noted that, in the touch display panel provided by the embodiments of the disclosure, the touch electrodes may include an inductive electrode and a drive electrode. The interior of at least one touch electrode being hollowed out may refer to an interior of at least one inductive electrode being hollowed out, or an interior of at least one drive electrode being hollowed out, or both the interior of at least one inductive electrode being hollowed out and the interior of at least one drive electrode being hollowed out, which is not specifically limited herein.

However, in practical applications, generally, the interference with the inductive electrode by the cathode is greater than the interference with the drive electrode by the cathode. Therefore, as a preferred manner, the interior of at least one inductive electrode may be hollowed out The technical solutions provided by the embodiments of the disclosure will be described below in detail with reference to the accompanying drawings.

FIG. 1 is a schematic structural view of a touch display panel provided by an embodiment of the disclosure.

As shown in FIG. 1, the touch display panel includes a plurality of inductive electrodes 11 (only two are shown in FIG. 1) which are arranged in a first direction (X direction shown in FIG. 1) and a plurality of drive electrodes 12 (only two are shown in FIG. 1) arranged in a second direction (Y direction shown in FIG. 1), and the plurality of inductive electrodes 11 and the plurality of drive electrodes 12 are intersected with each other. The first direction is perpendicular to the second direction.

Each of the inductive electrodes 11 includes a plurality of inductive sub-electrodes 111, and each of the drive electrodes 12 includes a plurality of drive sub-electrodes 121. The shape of each of the inductive sub-electrodes 111 and each of the drive sub-electrodes 121 is of a diamond shape. In another implementations, the shape of each of the inductive sub-electrodes 111 and each of the drive sub-electrodes 121 may also be of strip shape, which will not be specifically limited herein.

In FIG. 1, as for one of the inductive electrodes 11, interiors of three inductive sub-electrodes 111 of the inductive electrode 11 are hollowed out, so that the relative area between the inductive electrode 11 and the cathode may be reduced to the maximum extent. In another embodiment, as for the inductive sub-electrodes included in the one inductive electrode, the interiors of some inductive sub-electrodes may be hollowed out and the interiors of the other inductive sub-electrodes may not be hollowed out. The number of the inductive sub-electrodes with the hollowed-out interior may be determined according to actual conditions and is not specifically limited herein. The inductive sub-electrodes with the hollowed-out interior may be adjacent to the inductive sub-electrodes or non-adjacent inductive sub-electrodes, and are not specifically limited herein.

In the embodiment of the disclosure, as to one of the inductive electrodes 11, a plurality of inductive sub-electrodes 111 of the inductive electrodes 11 may be sequentially connected by first electrically conductive bridges 112. As to one of the drive electrodes 12, a plurality of drive sub-electrodes 121 of the drive electrodes 12 may be sequentially connected by second electrically conductive bridges 122. The first electrically conductive bridges 112 and the second electrically conductive bridges 122 are insulated from each other.

The plurality of inductive electrodes 11 and the plurality of drive electrodes 12 shown in FIG. 1 may be located in the same electrically conductive layer, and the first electrically conductive bridges 112 and the second electrically conductive bridges 122 may be located in different electrically conductive layers. For example, if the plurality of inductive electrodes 11 and the plurality of drive electrodes 12 are located in the electrically conductive layer A, the first electrically conductive bridges 112 are located in the electrically conductive layer A, and the second electrically conductive bridges 122 are located in the electrically conductive layer B (or, the first electrically conductive bridges 112 may be located in the electrically conductive layer B and the second electrically conductive bridges 122 may be located in the electrically conductive layer A). The electrically conductive layer A, the electrically conductive layer B and the cathode in the touch display panel may be arranged as: the electrically conductive layer A, the electrically conductive layer B, the cathode; or the electrically conductive layer B, the electrically conductive layer A, the cathode, along a top-to-bottom direction in sequence.

The plurality of inductive electrodes 11 and the plurality of drive electrodes 12 shown in FIG. 1 may also be located in different electrically conductive layers, and the first electrically conductive bridges 112 and the second electrically conductive bridges 122 are also located in different electrically conductive layers. For example, if the plurality of inductive electrodes 11 are located in the electrically conductive layer A, the first electrically conductive bridges 112 are also located in the electrically conductive layer A. If the plurality of drive electrodes 12 are located in the electrically conductive layer B, the second electrically conductive bridges 122 are also located in the electrically conductive layer B. The electrically conductive layer A, the electrically conductive layer B, and the cathode in the touch display panel may be arranged as: the electrically conductive layer A, the electrically conductive layer B, and the cathode, along a top-to-bottom direction in sequence.

In the embodiment of the disclosure, on the basis that the interior of the inductive electrode is hollowed out to alleviate the interference with the inductive electrode by the cathode, in order to alleviate the interference with the drive electrode by the cathode, the interior of at least one drive electrode in the touch display panel may be hollowed out. The size of the hollow-out area of the interior of the drive electrode may be determined according to actual needs, and is not specifically limited herein.

As shown in FIG. 1, the interiors of all of the three drive sub-electrodes 121 included in each of the drive electrodes 12 in FIG. 1 may be hollowed out. In this way, the relative area between the drive electrodes 12 and the cathode may be reduced to the maximum extent, thereby alleviating the interference with the drive electrode 12 by the cathode. As for the drive sub-electrodes included in the one drive electrode, the interiors of some drive sub-electrodes may be hollowed out and the interiors of the other drive sub-electrodes may not be hollowed out. The number of the drive sub-electrodes with the hollowed-out interior may be determined according to actual conditions and is not specifically limited herein. The drive sub-electrodes with the hollowed-out interior may be adjacent drive sub-electrodes or non-adjacent drive sub-electrodes, and are not specifically limited herein.

It should be noted that, in practical applications, as to the entire touch display panel, the interiors of the inductive sub-electrodes included therein may be hollowed out, and the interiors of the drive sub-electrodes are not hollowed out; or the interiors of the inductive sub-electrodes and the interiors of the inductive electrodes may be hollowed out; or part of the interiors of the inductive sub-electrodes are hollowed out and part of the interiors of the drive sub-electrodes are hollowed out, which is not specifically limited in the embodiment of the disclosure.

In another embodiment provided by the disclosure, on the basis that the interior of at least one inductive sub-electrode included in the touch display panel is hollowed out, or on the basis that the interior of at least one inductive sub-electrode included in the touch display panel is hollowed out and the interior of at least one drive sub-electrode included in the touch display panel is hollowed out, the adjacent inductive sub-electrodes and the drive sub-electrodes may be designed as a mutual nested structure in order to further improve the touch sensitivity of the touch display panel.

Specifically, the adjacent drive sub-electrodes and the inductive sub-electrodes are nested with each other, and may include:

A side of the drive sub-electrode and a side of the adjacent inductive sub-electrode respectively have a concave-convex structure, and the shapes of two concave-convex structures are consistent and matched with each other.

The convex portion of the drive sub-electrode may be nested in the concave portion of the inductive sub-electrode, and the convex portion of the inductive sub-electrode may be nested in the concave portion of the drive sub-electrode. The concave portion and the convex portion of the concave-convex structure may be rectangular, square, curved or other shapes, and are not specifically limited herein.

Figure 2:
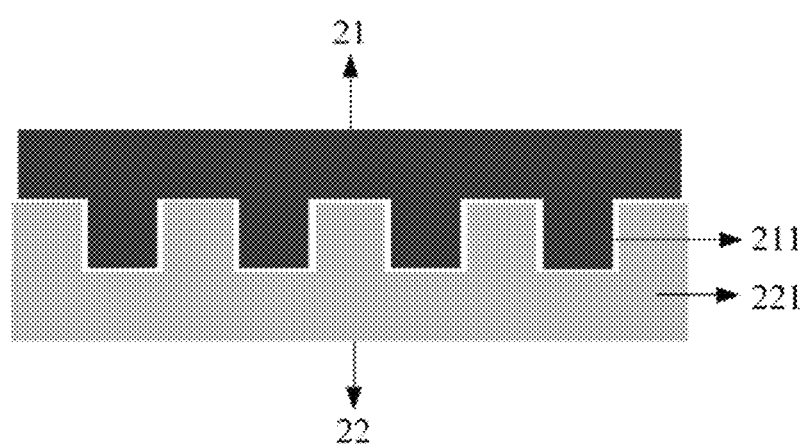
FIG. 2 is a schematic structural view of adjacent drive sub-electrodes and inductive sub-electrodes in a touch display panel provided by an embodiment of the disclosure.
Figure 3:
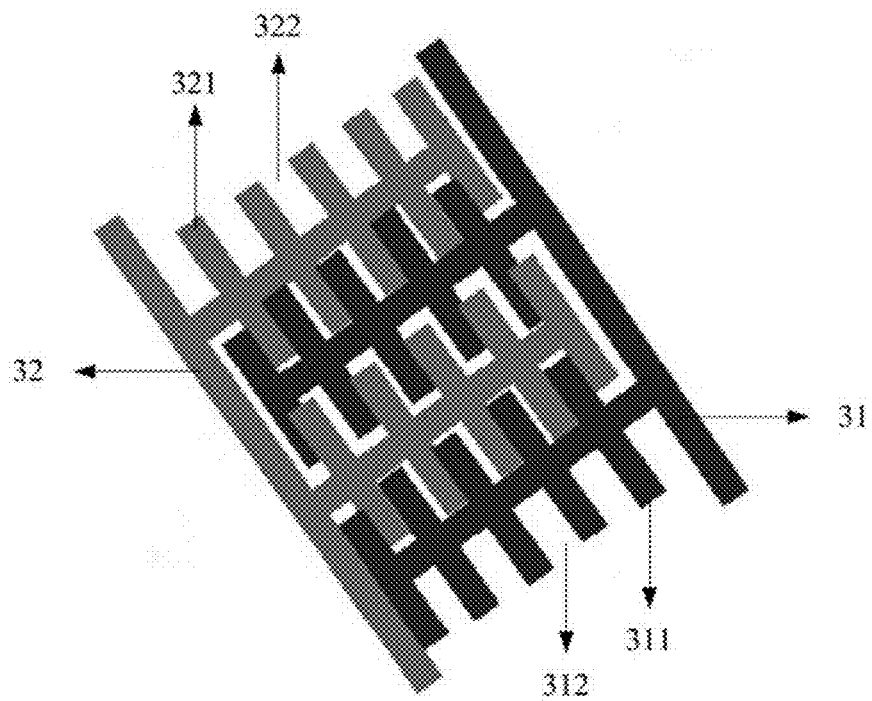
FIG. 3 is a schematic structural view of adjacent drive sub-electrodes and inductive sub-electrodes in another touch display panel provided by an embodiment of the disclosure.

See FIG. 2 and FIG. 3 for details.

In FIG. 2, mark 21 may refer to a side of the inductive sub-electrode 111 shown in FIG. 1. Mark 22 may refer to a side of the drive sub-electrode 121 shown in FIG. 1. The side 21 has a plurality of rectangular concave-convex structures 211, and the side 22 has a plurality of rectangular concave-convex structure 221, and the above two concave-convex structures are matched with each other. In this way, the relative area between the inductive sub-electrode 111 shown in FIG. 1 and the drive sub-electrode 121 shown in FIG. 1 may be increased, and the distance between the inductive sub-electrode 111 and the drive sub-electrode 121 is shortened, therefore the induced capacitance between the inductive sub-electrode 111 and the drive sub-electrode 121 is increased.

In FIG. 3, mark 31 refers to a side of the inductive sub-electrode 111 shown in FIG. 1, and mark 32 refers to a side of the drive sub-electrode 121 shown in FIG. 1, the side 31 of the inductive sub-electrode and the side 32 of the adjacent drive sub-electrode respectively have a concave-convex structure, and the shapes of the two concave-convex structures are consistent and matched with each other. As shown in FIG. 3, a convex portion 321 of the side 32 of the drive sub-electrode is embedded in a concave portion 312 of the side 31 of the inductive sub-electrode, and a convex portion 311 of the side 31 of the inductive sub-electrode is embedded in a concave portion 322 of the side 32 of the drive sub-electrode. The concave portions (312, 322 in FIG. 3) and the convex portions (311, 321 in FIG. 3) in the concave-convex structure are both rectangular shape. In other implementations, the concave portions and the convex portions may also be square or curved or other anisotropic structures.

For the entire touch display panel shown in FIG. 1, a side of at least one inductive sub-electrode 111 and a side of the adjacent drive sub-electrode 121 may be configured as the above-described concave-convex structure, and preferably, the side of each inductive sub-electrode 111 and the side of the adjacent drive sub-electrode 121 may be configured as the concave-convex structure, so that the mutual capacitance between the plurality of drive electrodes and the plurality of inductive electrodes in the touch display panel may be increased to the maximum extent, thereby improving the touch sensitivity of the touch display panel.

In this way, by designing the inductive sub-electrodes and the adjacent drive sub-electrodes as the concave-convex structure, on the one hand, the relative area between the inductive sub-electrodes and the drive sub-electrodes may be increased, and on the other hand, the distance between the inductive sub-electrodes and the drive sub-electrodes may be shortened. The mutual capacitance between the inductive electrodes and the drive electrodes may be effectively increased. When the touch display device is touched, the change in capacitance detected by the inductive electrode may be increased, and the detection sensitivity of the inductive electrode and the touch sensitivity of the touch display panel may be effectively improved.

In an embodiment of the disclosure, the adjacent drive sub-electrode and the inductive sub-electrode are nested with each other, and may further include:

a side of the drive sub-electrode and a side of the adjacent inductive sub-electrode respectively have a spiral structure having a spiral wall and a gap, and the shapes of the two spiral structures are consistent and matched with each other.

The spiral wall of the drive sub-electrode may be nested into a gap between spiral walls of the inductive sub-electrode, the spiral wall of the inductive sub-electrode may be nested into the gap between the spiral walls of the drive sub-electrode, and two different spiral walls may constitute a Fermat spiral structure.

Figure 4:
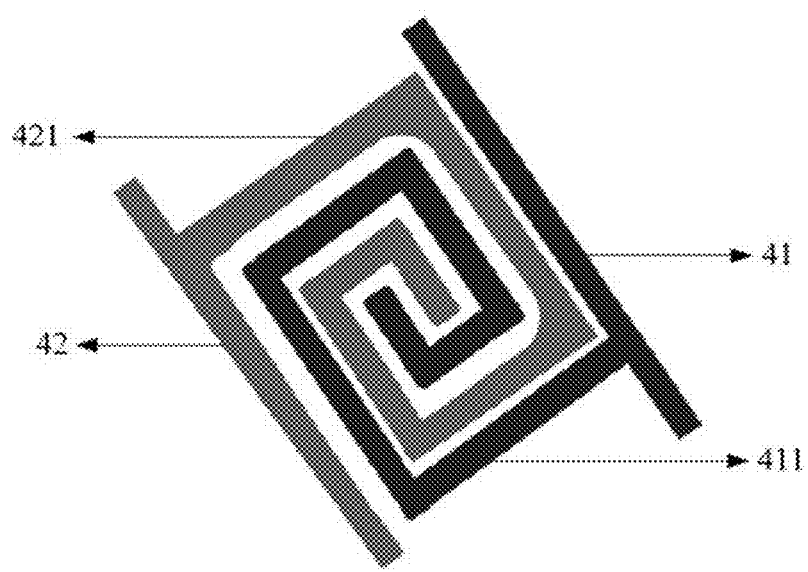
FIG. 4 is a schematic structural view of adjacent drive sub-electrodes and inductive sub-electrodes in still another touch display panel provided by an embodiment of the disclosure.

As shown in FIG. 4, mark 41 in FIG. 4 refers to a side of the inductive sub-electrode 111 shown in FIG. 1, and mark 42 refers to a side of the drive sub-electrode 121 shown in FIG. 1. The side 41 is a spiral structure and has a spiral wall 411, and the side 42 is a spiral structure and has a spiral wall 421. The spiral wall 411 and the spiral wall 421 have the same shape, and the spiral wall 411 is nested into a gap between the spiral walls 421, and the spiral wall 421 is nested into a gap between the spiral walls 411. In this way, the relative area between the inductive sub-electrode 111 shown in FIG. 1 and the drive sub-electrode 121 shown in FIG. 1 may be increased, and the distance between the inductive sub-electrode 111 and the drive sub-electrode 121 may be shortened, thereby the induced capacitance between the inductive sub-electrode 111 and the drive sub-electrode 121 is increased.

As to the touch display panel shown in FIG. 1, the side of the at least one inductive sub-electrode 111 and the side of the adjacent drive sub-electrode 121 may be configured as the spiral structure described above, and preferably, the side of each inductive sub-electrode 111 and the adjacent side of the drive sub-electrode 121 may be configured as the spiral structure described above, so that the mutual capacitance between the plurality of drive electrodes and the plurality of inductive electrodes in the touch display panel may be increased to the maximum extent, thereby improving the touch sensitivity of the touch display panel.

In this way, by designing the inductive sub-electrodes and the adjacent drive sub-electrodes as the spiral structure, on the one hand, the relative area between the inductive sub-electrodes and the drive sub-electrodes may be increased, and on the other hand, the distance between the inductive sub-electrodes and the drive sub-electrodes may be shortened. The mutual capacitance between the inductive electrodes and the drive electrodes may be effectively increased. When the touch display device is touched, the change in capacitance detected by the inductive electrodes may be increased, and the detection sensitivity of the inductive electrodes and the touch sensitivity of the touch display panel may be effectively improved.

It should be noted that, in practical applications, for the entire touch display panel, sides of all drive sub-electrodes and sides of the adjacent inductive sub-electrodes may be configured as the concave-convex structure, or the spiral structure, or the sides of some drive sub-electrodes and the sides of the adjacent inductive sub-electrodes may be configured as the concave-convex structure, and the sides of the other drive sub-electrodes and the sides of the adjacent inductive sub-electrodes may be configured as the spiral structure, and the embodiment of the disclosure is not specifically limited thereto.

In an embodiment of the disclosure, the inductive sub-electrode and the drive sub-electrode may further have a plurality of mesh units. In this way, it may also be regarded as the inductive sub-electrode and the drive sub-electrode with hollowed-out interiors, wherein a manner for hollowing out may be a manner that makes the inductive sub-electrode and the drive sub-electrode have a mesh structure.

Figure 5:
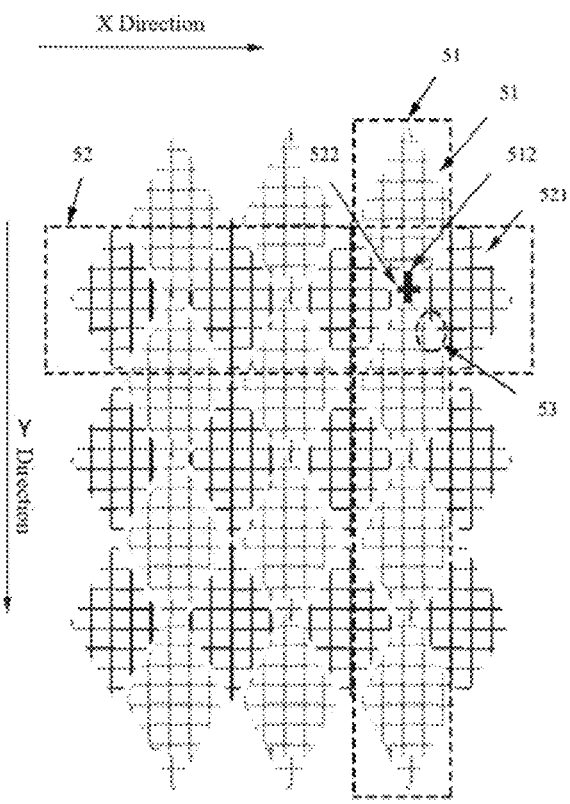
FIG. 5 is a schematic structural view of another touch display panel provided by an embodiment of the disclosure.

As shown in FIG. 5, the touch display panel includes: at least one drive electrode 51 arranged along a first direction Y, and at least one inductive electrode 52 arranged along a second direction X perpendicular to the first direction Y.

Each drive electrode 51 includes a plurality of mutually independent drive sub-electrodes 511. The plurality of drive sub-electrodes 511 of each touch drive electrode 51 are connected by first electrically conductive bridges 512. Each inductive electrode 52 includes a plurality of mutually independent inductive sub-electrodes 521. The plurality of inductive sub-electrodes 521 of each inductive electrode 52 are connected by second electrically conductive bridges 522. The first electrically conductive bridge 512 and the second electrically conductive bridge 522 are insulated from each other.

In FIG. 5, the drive sub-electrode 511 and the inductive sub-electrode 521 include a plurality of mesh units. The magnitude or size of the mesh unit is not limited herein.

In FIG. 5, the adjacent drive sub-electrodes 511 and inductive sub-electrodes 521 may also be nested with each other (position 53 in FIG. 5). For the manner of nesting, please refer to the contents described in the embodiment shown in FIG. 2 or FIG. 3.

The touch display panel provided by the embodiments of the disclosure includes a cathode and a plurality of inductive electrodes, the interior of at least one inductive electrode is hollowed out to reduce the relative area between the inductive electrode and the cathode. In the embodiments of the disclosure, by hollowing out the interior of the inductive electrode in the touch display panel, the relative area between the inductive electrode and the cathode of the touch display panel may be reduced, thereby reducing the inductive capacitance between the inductive electrode and the cathode. In this way, when touching the touch display panel, since the inductive capacitance between the cathode and the inductive electrode becomes smaller, a larger change in the capacitance can be detected by the inductive electrode, the interference with the inductive electrode by the cathode can be effectively alleviated, thereby improving the detection sensitivity of the inductive electrode and the touch sensitivity of the touch display panel.

It should be noted that, in the foregoing embodiment, at least one touch electrode in the touch display panel is internally hollowed out, thereby alleviating the interference with the touch electrode by the cathode and improving the touch sensitivity of the touch display panel. In addition, in other embodiments provided by the disclosure, an area in the cathode of the touch display panel corresponding to the position of the touch electrode is hollowed out, thereby reducing the interference with the touch electrode by the cathode and improving touch sensitivity of the touch display panel.

Figure 6:
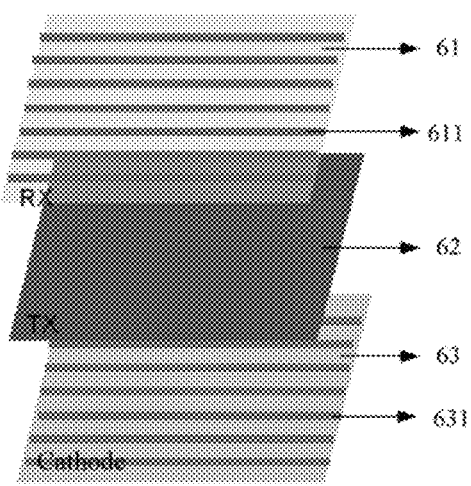
FIG. 6 is a schematic structural view of still another touch display panel provided by an embodiment of the disclosure.
Figure 7:
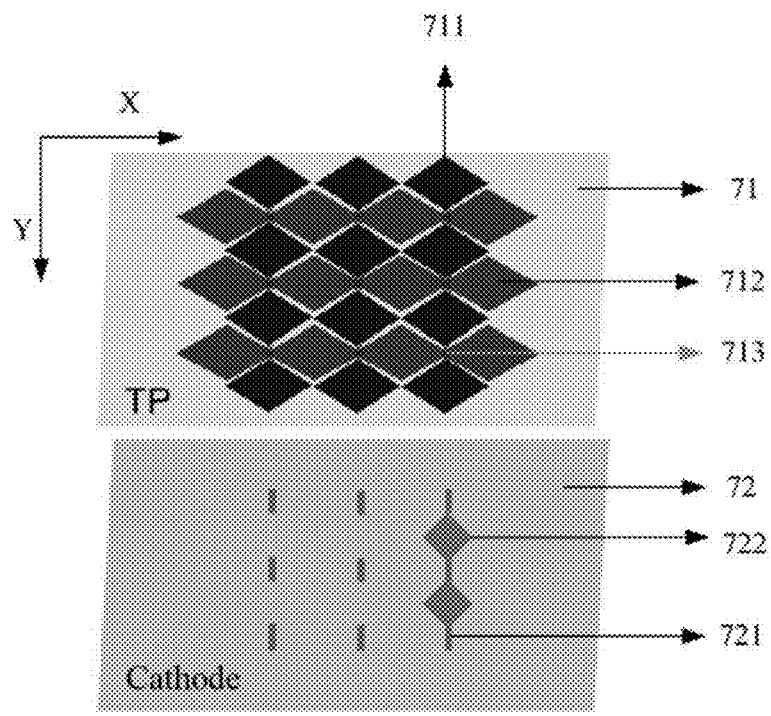
FIG. 7 is a schematic structural view of still another touch display panel provided by an embodiment of the disclosure.

Please refer to FIG. 6 and FIG. 7 for details.

FIG. 6 is a schematic structural view of a touch display panel provided by an embodiment of the disclosure. The touch display panel is as follows.

The touch display panel shown in FIG. 6 may include an inductive electrode layer 61, a drive electrode layer 62, and a cathode layer 63. The position relationship among them from top to bottom may be: the inductive electrode layer 61, the drive electrode layer 62, and the cathode layer 63. Wherein, the inductive electrode layer 61 includes a plurality of inductive electrodes 611. The drive electrode layer 62 includes a plurality of drive electrodes (not specifically shown in FIG. 6), and the cathode layer 63 may be regarded as a cathode of the touch display panel.

In FIG. 6, the cathode may include a plurality of hollow-out areas 631, and the number of the hollow-out areas 631 is the same as the number of inductive electrodes 611 (7 inductive electrodes 611 and 7 hollow-out areas 631 are only shown in FIG. 6). There is one-to-one correspondence between the position of each hollow-out area 631 and the position of each inductive electrode 611.

In this way, as for the entire cathode, the relative area between the cathode and the inductive electrode may be reduced, thereby reducing the inductive capacitance between the cathode and the inductive electrode. When the touch display panel is touched, the interference with the inductive electrode by the cathode may be effectively alleviated, thereby improving the touch sensitivity of the touch display panel.

It should be noted that, in the touch display panel shown in FIG. 6, the number of the hollow-out areas included in the cathode may be smaller than that of the inductive electrodes. For example, the cathode of the touch display panel shown in FIG. 6 may include five hollow-out areas, and the position of each hollow-out area may correspond to that of one inductive electrode (i.e., cathode areas corresponding to two inductive electrode positions are not hollowed out). Thus, as for the entire cathode, the relative area between the cathode and the inductive electrode may also be reduced, thereby alleviating the interference with the inductive electrode by the cathode.

In addition, the number of the hollow-out areas included in the cathode may be greater than that of the inductive sub-electrodes included In the inductive electrode. For example, as for one of the inductive electrodes shown in FIG. 6, the cathode area corresponding to the position thereof may be hollowed out to obtain two or more hollow-out areas, and the positions of these hollow-out areas correspond to those of the inductive electrodes. Thus the relative area between the cathode and the inductive electrode can also be reduced, thereby alleviating the interference with the inductive electrode by the cathode.

In practical applications, the number of the hollow-out areas included in the cathode may be determined according to the sensitivity requirement of the inductive electrode, and is not specifically limited herein. As a preferred manner, it may be determined that the number of the hollow-out areas included in the cathode is the same as that of the inductive electrodes, and there is one-to-one correspondence between the positions of the hollow-out areas and those of the inductive electrodes.

In FIG. 6, the shape of each hollow-out area 631 may be the same as that of the inductive electrode 611. Each hollow-out area 631 may have a strip shape, and the area of each hollow-out area 631 may be equal to that of the inductive electrode 611 corresponding to the position thereof. Thus, as for the entire cathode, the relative area between the cathode and the inductive electrode may be reduced to the greatest extent, thereby effectively alleviating the interference with the inductive electrode by the cathode.

In addition, the area of each hollow-out area 631 in FIG. 6 may also be smaller than the area of the inductive electrode 611 corresponding to the position thereof, such that as for the entire cathode, in the premise that the relative area between the cathode and the inductive electrodes may be reduced, the display function of the cathode is not damaged as much as possible. The specific area of each hollow-out area 631 may be determined according to the detection sensitivity requirement of the inductive electrode or the touch sensitivity requirement of the touch display panel, and is not specifically limited herein.

The touch display panel provided by the embodiment of the disclosure includes a cathode and a plurality of inductive electrodes, wherein the cathode includes at least one hollow-out area, and the position of the hollow-out area corresponds to that of the inductive electrode to reduce the relative area between the cathode and the inductive electrode. In this way, as for the entire cathode, the relative area between the cathode and the inductive electrode may be reduced by hollowed out the area of the cathode in the touch display panel corresponding to the inductive electrode, thereby reducing the inductive capacitance between the cathode and the inductive electrode. In this way, when touching the touch display panel, owing to the reduced inductive capacitance between the cathode and the inductive electrode, compared with the prior art, the interference with the inductive electrode by the cathode may be alleviated and change in capacitance detected by the inductive electrode may be increased, thereby improving the detection sensitivity of the inductive electrode and further improving the touch sensitivity of the touch display panel.

FIG. 7 is a schematic structural view of another touch display panel provided by an embodiment of the disclosure. The touch display panel is as follows.

The touch display panel as shown in FIG. 7 includes a touch electrode layer 71 and a cathode layer 72. The touch electrode layer 71 may be located above the cathode layer 72. The touch electrode layer 71 may include a plurality of inductive electrodes 711 and a plurality of drive electrodes 712. The cathode layer 72 may be regarded as a cathode of the touch display panel.

In FIG. 7, the plurality of inductive electrodes 711 and the plurality of drive electrodes 712 are located in the same electrically conductive layer 71 (i.e., the touch electrode layer 71) and intersected with each other, wherein the plurality of inductive electrodes 711 may be arranged in a first direction (X-direction in FIG. 7), and the plurality of drive electrodes 712 may be arranged in a second direction (Y-direction in FIG. 7). The first direction intersects the second direction. In the embodiment of the disclosure, the plurality of inductive electrodes 711 and the plurality of drive electrodes 712 may be transparent and electrically conductive materials or metal materials.

As for one of the inductive electrodes 711, the inductive electrode 711 may include a plurality of sequentially connected inductive sub-electrodes (four inductive sub-electrodes shown in FIG. 7), and each of them has a diamond shape; For one drive electrode 712, the drive electrode 712 may include four sequentially connected drive sub-electrodes, and each of them has a diamond shape.

It should be noted that, in other implementations, as for one of the inductive electrodes, each inductive sub-electrode included therein may also have a strip shape, or some inductive sub-electrodes may have a diamond shape and the other inductive sub-electrodes may have a strip shape, and is not specifically limited herein. Similarly, as for one of the drive electrodes, each drive sub-electrode included therein may also have a strip shape, or some drive sub-electrodes may have a diamond shape, and the other drive sub-electrodes may have a strip shape, as long as the pattern of the inductive sub-electrode and the drive sub-electrode may spread throughout the display area of the touch display panel.

In the touch display panel shown in FIG. 7, as for each inductive electrode 711, the inductive electrode 711 may include at least one electrode area 713 intersected with the drive electrode 712. As shown in FIG. 7, one inductive electrode 711 includes three electrode areas 713, and three inductive electrodes 711 include nine electrode areas 713. Wherein, the inductive electrode corresponding to the position of each electrode area 713 is not connected to the drive electrode 712.

It should be noted that the plurality of electrode areas 713 in which the inductive electrode 711 is intersected with the drive electrode 712 shown in FIG. 7 are generally bridges for connecting the plurality of inductive sub-electrodes. In the embodiment of the disclosure, the plurality of electrode areas 713 may be regarded as part of the inductive electrodes 711. The inductive capacitance may be generated between the electrode area 713 and the cathode. When the display touch surface is touched, the cathode would interfere with the inductive electrode 711 via the electrode area 713.

In the touch display panel shown in FIG. 7, at least one hollow-out area 721 may be included in the cathode layer 72, and the position of each hollow-out area 721 corresponds to the position of one electrode area 713, respectively. As shown in FIG. 7, the cathode layer 72 includes nine hollow-out areas 721. There is a one-to-one correspondence between the position of each hollow-out area 721 and the position of one of the nine electrode areas 713 included in the electrode layer 71. In this way, the relative area between the cathode and the electrode area may be reduced, thereby reducing the relative area between the cathode and the inductive electrode, and alleviating the interference with the inductive electrode by the cathode.

The number of the hollow-out areas 721 included in the cathode described in FIG. 7 is the same as that of the electrode areas 713. In other implementations, the number of the hollow-out areas 721 may be smaller than that of the inductive areas 713. In this way, the relative area between the cathode and the inductive electrode may also be reduced, thereby alleviating the interference with the inductive electrode by the cathode.

In FIG. 7, as for one of the hollow-out areas 721, the shape of the hollow-out area 721 may be the same as that of the inductive area 713 corresponding to the position of the hollow-out area 721. As shown in FIG. 7, the inductive area 713 may have a strip shape, and the hollow-out area 721 may also have a strip shape. In addition, the area of the hollow-out area 721 may also be the same as that of the inductive area 713 corresponding to the position of the hollow-out area 721, so that the relative area between the hollow-out area 721 and the inductive area 713 may be reduced to the greatest extent, thereby effectively reducing the relative area between the cathode and the inductive electrode.

In addition, the area of the hollow-out area 721 may also be smaller than that of the inductive area 713 corresponding to the position of the hollow-out area 721, to reduce the area of the hollow-out area of the cathode, thereby avoiding damage to the display function of the cathode.

The cathode layer 72 shown in FIG. 7 may include a plurality of hollow-out areas 722 in addition to the plurality of hollow-out areas 721, and the position of each of the hollow-out areas 722 may correspond to that of one of the inductive sub-electrodes. Specifically, the number of the hollow-out areas 722 may not be greater than that of the inductive sub-electrodes, which may be specifically determined according to actual needs, and is not specifically limited herein. For one of the hollow-out areas 722, the shape of the hollow-out area 722 may be the same as the shape of the inductive sub-electrode 711 corresponding to the position of the hollow-out area 722, and the area of the hollow-out area 722 may be smaller than that of the inductive sub-electrode 711. In this way, based on the cathode area corresponding to the electrode area being hollowed out, the cathode area corresponding to the at least one inductive sub-electrode is hollowed out, thereby effectively reducing the relative area between the inductive electrode and the cathode, thereby further alleviating the interference with the inductive electrode by the cathode.

It should be noted that, in practical applications, it may be preferable that the cathode portion corresponding to the electrode area in which the inductive electrode is overlapped with the drive electrode is hollowed out, because the interference with the inductive electrode by the cathode area corresponding to the position of the electrode area is more obvious than the interference with the inductive electrode by the cathode area corresponding to the position of the inductive sub-electrode. Therefore, in order to effectively alleviate the interference with the inductive electrode by the cathode, and avoid damage to the display function of the cathode as far as possible, preferably, the position in the cathode corresponding to the electrode area may be hollowed out.

The touch display panel provided by the embodiment of the disclosure includes a cathode, a plurality of inductive electrodes, and a plurality of drive electrodes, wherein the plurality of inductive electrodes and the plurality of drive electrodes are located in the same electrically conductive layer, and are intersected with each other and include at least one intersecting electrode area; the cathode includes at least one hollow-out area, and the position of each hollow-out area corresponds to the position of one of the electrode areas.

In this way, the relative area between the cathode and the inductive electrode may be reduced by hollowing out the area in the cathode corresponding to the overlapping portion between the inductive electrode and the drive electrode, thereby reducing the inductive capacitance between the cathode and the inductive electrode. In this way, when touching the touch display panel, owing to the reduced inductive capacitance between the cathode and the inductive electrode, compared with the prior art, the interference with the inductive electrode by the cathode may be alleviated and change in capacitance detected by the inductive electrode may be increased, thereby improving the detection sensitivity of the inductive electrode and further improving the touch sensitivity of the touch display panel.

In an embodiment provided by the disclosure, in order to reduce the influence of the cathode in the touch display panel on the touch electrodes, a material for the encapsulation layer between the cathode and the touch electrode may be a material with low dielectric constant which may range from 3 to 8. The material with low dielectric constant may be silicon oxide or silicon oxynitride, and may also be other materials with low dielectric constant.

Thus, the inductive capacitance between the cathode and the touch electrodes in the touch layer in the display panel may be reduced. When touching the touch display panel, owing to the reduced inductive capacitance between the cathode and the inductive electrode and between the cathode and the drive electrode, compared with the prior art, the interference with the touch electrode by the cathode may be alleviated, thereby reducing the damage to the touch function of the touch display panel and improving the touch sensitivity of the touch display panel In the embodiment of the disclosure, in order to further reduce interference between the cathode and the touch electrode, the thickness of the encapsulation layer may be between 1 and 10 µm.

In addition, in order to increase the inductive capacitance between the touch electrodes (i.e., between the drive electrode and the inductive electrode), the insulation layer between the drive electrode and the inductive electrode may adopt a material with high dielectric constant which may be greater than or equal to 30. The material with high dielectric constant may be silicon nitride, or titanium oxide, or may be other materials with high dielectric constant such as alumina, magnesia, or zirconia, and are not specifically limited herein.

In this way, the inductive capacitance between the inductive electrode and the drive electrode may be increased. When the touch display panel is touched, owing to the increased inductive capacitance between the inductive electrode and the drive electrode, the interference with the inductive electrode and the drive electrode by the cathode may be alleviated, thereby improving the touch sensitivity of the touch display panel.

In order to further increase the inductive capacitance between the inductive electrode and the drive electrode, the thickness of the insulation layer may also be set between 0.01 and 10 µm.

It should be noted that, in the existing touch display panel, because the distance between the display panel and the touch electrode is relatively close, the drive signal in the display panel is easy to interfere with the inductive electrode in the touch electrode, resulting in the damaged touch function.

In view of this, the embodiments of the disclosure also provide a touch display panel which includes: a first electrically conductive layer, a second electrically conductive layer, and a display panel, wherein the first electrically conductive layer includes a plurality of inductive electrodes; the second electrically conductive layer includes a plurality of a drive electrode; and the second electrically conductive layer is located between the first electrically conductive layer and the display panel; an orthographic projection area of the plurality of the inductive electrodes on the display panel falls into the orthographic projection area of the plurality of the drive electrodes on the display panel. Thus, since the drive electrode is located between the inductive electrode and the display panel, and the orthographic projection area of the inductive electrode on the display panel falls into the orthographic projection area of the drive electrode on the display panel, the electromagnetic field generated by drive signals may be effectively blocked or absorbed by the drive electrode. When the touch display panel is touched, the interference with the inductive electrode by the drive signal may be effectively alleviated, thereby ensuring the touch function of the touch display panel.

Please refer to FIG. 8 to FIG. 12 for details.

Figure 8:
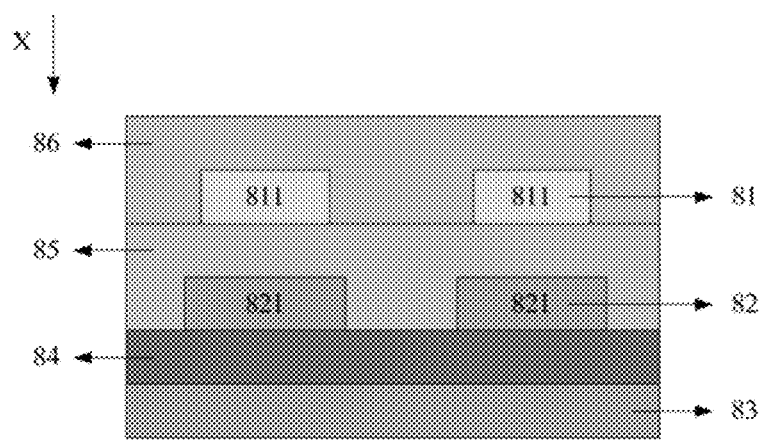
FIG. 8 is a side view of a touch display panel provided by an embodiment of the disclosure.

FIG. 8 is a side view of a touch display panel provided by an embodiment of the disclosure. FIG. 8 is a top view of a touch display panel as shown in FIG. 8. The touch display panel is as follows.

In FIG. 8, the touch display panel may include a first electrically conductive layer 81, a second electrically conductive layer 82, and a display panel 83. The first electrically conductive layer 81 includes a plurality of inductive electrodes 811, and the second electrically conductive layer 82 includes a plurality of drive electrode 821. The second electrically conductive layer 82 is located between the first electrically conductive layer 81 and the display panel 83. In addition, the touch display panel shown in FIG. 8 may further include an encapsulation layer 84, an insulation layer 85, and a protective layer 86. Wherein, the encapsulation layer 84 is located between the second electrically conductive layer 82 and the display panel 83, and the encapsulation layer 84 may be a thin film encapsulation layer for encapsulating the display panel, or may be a substrate layer among thin film encapsulation layer, the touch layer and the thin film encapsulation layer, or may also include both the thin film encapsulation layer and the substrate layer, which is not specifically limited here.

The insulation layer 85 is located between the first electrically conductive layer 81 and the second electrically conductive layer 82 for insulating the inductive electrode 811 and the drive electrode 821. The protective layer 86 covers the first electrically conductive layer 81 and is used for protecting the inductive electrode 811.

In the embodiment of the disclosure, an orthographic projection area of the plurality of inductive electrodes 811 on the display panel 83 falls into an orthographic projection area of the plurality of drive electrodes 821 on the display panel 83. Specifically:

The X direction in FIG. 8 may be regarded as an orthogonal projection direction of the inductive electrode 811 on the display panel 83, and an orthogonal projection direction of the drive electrode 821 on the display panel 83. As can be seen from FIG. 8, a width of the orthographic projection area of the inductive electrode 811 on the display panel 83 falls into a width of the orthographic projection area of the drive electrode 821 on the display panel 83.

Figure 9:
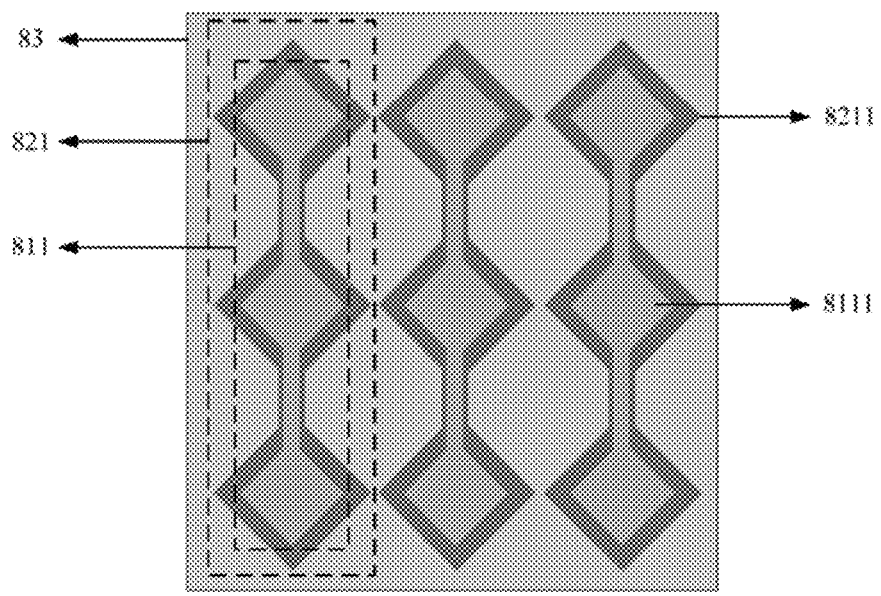
FIG. 9 is a top view of a touch display panel provided by an embodiment of the disclosure.

FIG. 9 is a top view of the touch display panel shown in FIG. 8, wherein a direction perpendicular to the display panel 83 may be regarded as an orthographic projection direction of the inductive electrode 811 on the display panel 83, and an orthographic projection direction of the drive electrode 821 on the display panel 83. As can be seen in conjunction with FIGS. 8 and 9, the orthographic projection area of the inductive electrode 811 on the display panel 83 falls into the orthographic projection area of the drive electrode 821 on the display panel 83.

Thus, since the drive electrode 821 is located between the inductive electrode 811 and the display panel 83, and the orthographic projection area of the inductive electrode 811 on the display panel 83 falls into the orthographic projection area of the drive electrode 821 on the display panel 83, the electromagnetic field generated by drive signals in the display panel 83 may be effectively blocked or absorbed by the drive electrode 821, thereby alleviating the influence of the electromagnetic field on the inductive electrode. When the touch display panel is touched, the interference with the inductive electrode 811 by the drive signal may be effectively alleviated, thereby ensuring the touch function of the touch display panel.

In the touch display panel shown in FIG. 9, each inductive electrode 811 further includes a plurality of sequentially connected inductive sub-electrodes 8111, and each drive electrode 821 further includes a plurality of sequentially connected drive sub-electrodes 8211, wherein the number of the inductive sub-electrodes 8111 included in one inductive electrode 811 is the same as the number of the drive sub-electrodes 8211 included in one drive electrode 821, and the number of the inductive sub-electrodes 8111 included in the touch display panel is the same as the number of the drive sub-electrodes 8211 included in the touch display panel.

It can be seen in conjunction with FIG. 8 and FIG. 9, for one of the drive sub-electrodes 8211, the number of the inductive sub-electrodes 8111 corresponding to the position of the drive sub-electrode 8211 is one along the orthographic projection direction, and the orthographic projection area of the inductive sub-electrode 8111 on the display panel 83 falls into the orthographic projection area of the drive sub-electrode 8211 corresponding to the position thereof on the display panel 83.

In this way, since the orthographic projection area of each inductive sub-electrode 8111 on the display panel 83 falls into the orthographic projection area of one of the drive sub-electrodes 8211 on the display panel 83, respectively, for each drive sub-electrode 8211, the electromagnetic field generated by the drive signals which interfere with one of the inductive electrodes 8111 may be effectively blocked or absorbed, thereby alleviating the interference with the inductive sub-electrode 8111 by the electromagnetic field. For the entire touch display panel, the interference with the inductive electrode 811 by the drive signal may be effectively alleviated.

In the touch display panel shown in FIG. 9, each inductive sub-electrode 8111 and each drive sub-electrode 8211 have a diamond shape. In other embodiments, each inductive sub-electrode 8111 and each drive sub-electrode 8211 may also have a strip shape, or each inductive sub-electrode 8111 has a diamond shape, and each drive sub-electrode 8211 has a strip shape, or the like, which is not specifically limited in the embodiment of the disclosure, as long as the orthographic projection area of the inductive electrode 811 on the display panel 83 falling into the orthographic projection area of the drive electrode 821 on the display panel 83 is satisfied.

In other embodiments of the disclosure, the number of the inductive sub-electrodes included in at least one inductive electrode of the touch display panel may be greater than the number of the drive sub-electrodes included in one of the drive electrodes, and the orthographic projection area of at least one inductive sub-electrode on the display panel falls into the orthographic projection area of one of the drive sub-electrodes on the display panel.

Figure 10:
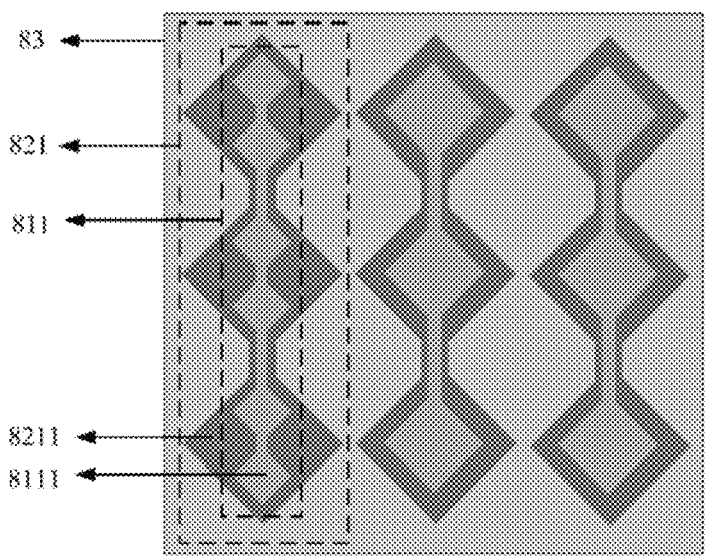
FIG. 10 is a top view of another touch display panel provided by an embodiment of the disclosure.

FIG. 10 is another top view of the touch display panel shown in FIG. 8. In FIG. 10, the number of the inductive sub-electrodes 8111 included in the inductive electrode 811 is larger than the number of the drive sub-electrodes 8211 included in the drive electrode 821, and the direction perpendicular to the display panel 83 may be an orthogonal projection direction of the inductive electrode 811 on the display panel 83 and an orthogonal projection direction of the drive electrode 821 on the display panel 83.

For the drive sub-electrode 8211 shown in FIG. 10, the number of the inductive sub-electrodes 8111 corresponding to the position of the drive sub-electrode 8211 in the orthogonal projection direction is two, and the orthogonal projection area of the two inductive electrodes 8111 on the display panel 83 falls into the orthographic projection area of the drive sub-electrode 8211 on the display panel 83.

Since the orthographic projection area of every two inductive sub-electrodes 8111 on the display panel 83 falls into the orthographic projection area of one of the drive sub-electrodes 8211 on the display panel 83, for each drive sub-electrode 8211, the electromagnetic field generated by the drive signals which interfere with the two inductive electrodes 8111 may be effectively blocked or absorbed, thereby alleviating the interference with the two inductive sub-electrodes 8111 by the electromagnetic field. For the entire touch display panel, the interference with the inductive electrode 811 by the drive signals may be effectively alleviated.

In another embodiment provided by the disclosure, the second electrically conductive layer in the touch display panel shown in FIG. 8 may further include a plurality of filling blocks, wherein:

The plurality of filling blocks fill a gap between the plurality of drive electrodes;

The plurality of filling blocks are insulated from each other, and the plurality of filling blocks and the plurality of drive electrodes are insulated from each other.

Figure 11:
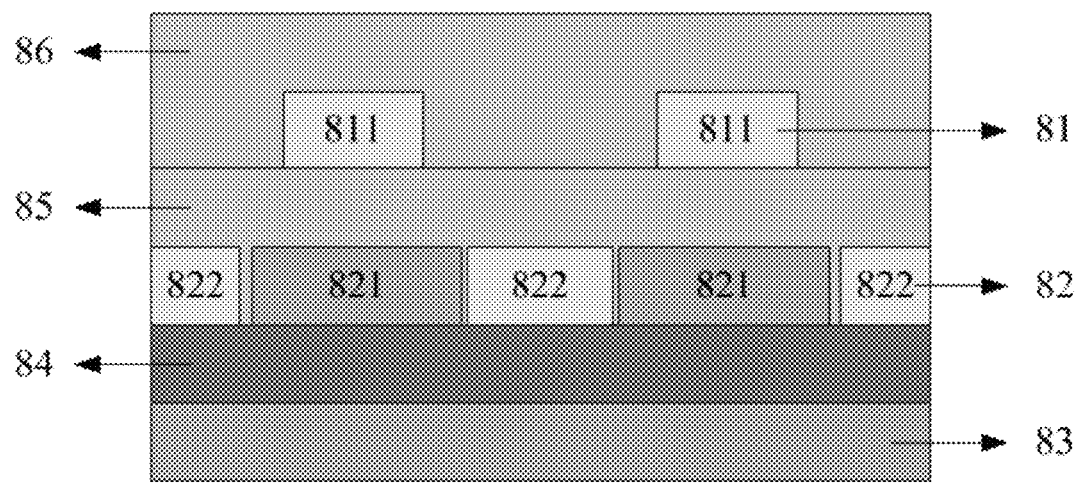
FIG. 11 is a side view of another touch display panel provided by an embodiment of the disclosure.
Figure 12:
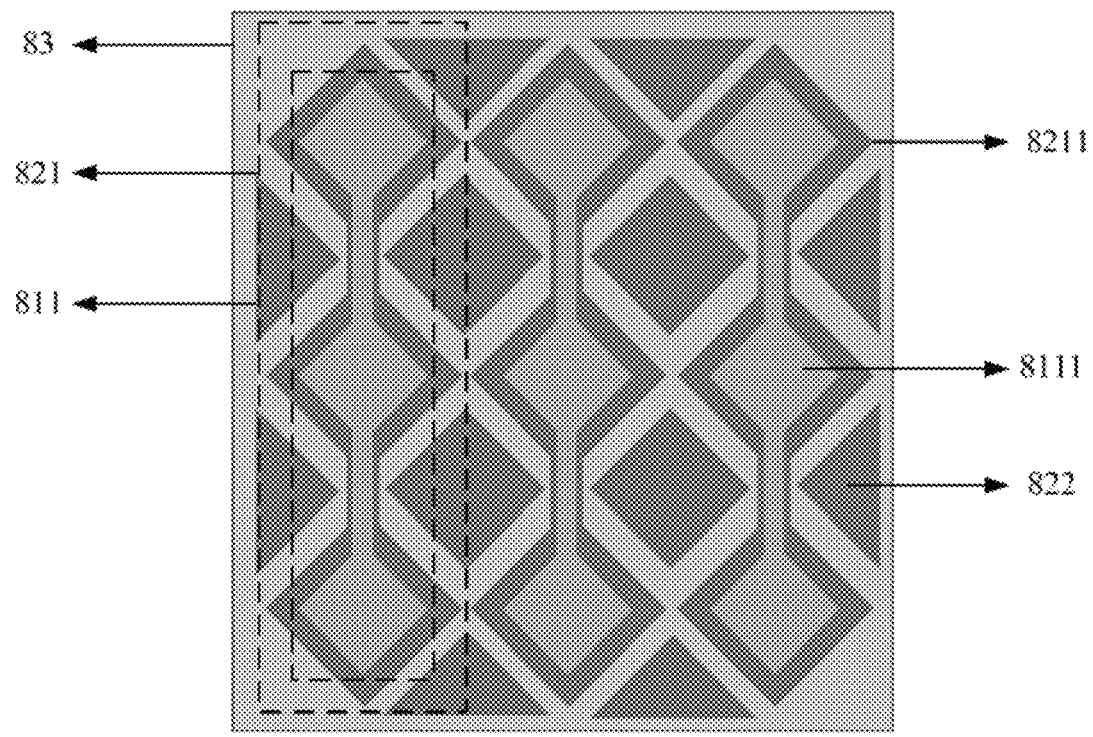
FIG. 12 is a top view of still another touch display panel provided by an embodiment of the disclosure.

As shown in FIG. 11, as compared with FIG. 8, the second electrically conductive layer in the touch display panel shown in FIG. 11 may include a plurality of filling blocks 822, the materials for the plurality of filling blocks 822 may be the same as those of the drive electrodes 821. FIG. 12 is a top view of the touch display panel as shown in FIG. 11. As can be seen from FIG. 12, for each filling block 822, it fills the gap between the drive electrodes 821, but is insulated from each of the drive electrodes 821, and the plurality of filling blocks 822 may be insulated from each other.

Since the plurality of filling blocks 822 are electrically conductive and fill the gap between the plurality of drive electrodes 821, the electromagnetic field of drive signals between the gaps of the plurality of drive electrodes 821 may be effectively blocked or absorbed, preventing the electromagnetic field from acting on the inductive electrode 811 by the gaps between the plurality of drive electrodes 821 and interfering with the inductive electrode 811. In other words, after the plurality of filling blocks 821 filling the gap between the plurality of drive electrodes 821, the interference with the inductive electrodes 811 by the electromagnetic field generated by the drive signal may be more effectively alleviated, thereby ensuring the touch function of the touch display panel.

The touch display panel provided by the embodiment of the disclosure includes: a first electrically conductive layer, a second electrically conductive layer, and a display panel, wherein the first electrically conductive layer includes a plurality of inductive electrodes; the second electrically conductive layer includes a plurality of a drive electrode; and the second electrically conductive layer is located between the first electrically conductive layer and the display panel; an orthographic projection area of the plurality of inductive electrodes on the display panel falls into an orthographic projection area of the plurality of drive electrodes on the display panel. Thus, since the drive electrode is located between the inductive electrode and the display panel and the orthographic projection area of the inductive electrode on the display panel falls into the orthographic projection area of the drive electrode on the display panel, the electromagnetic field generated by drive signals may be effectively blocked or absorbed by the drive electrode. When the touch display panel is touched, the interference with the inductive electrode by the drive signal may be effectively alleviated, thereby ensuring the touch function of the touch display panel.

In order to achieve the purpose of the disclosure, an embodiment of the disclosure further provides a touch display panel, including: a drive electrode and an inductive electrode intersected with the drive electrode, wherein, The drive electrode includes a plurality of mutually independent drive sub-electrodes, and the inductive electrodes include a plurality of mutually independent touch inductive sub-electrodes;

the adjacent drive sub-electrodes and the inductive sub-electrodes are nested with each other.

In an implementation, the adjacent drive sub-electrodes and the inductive sub-electrodes are nested with each other, and may include:

a side of the drive sub-electrode and a side of the adjacent inductive sub-electrode each have a concave-convex structure and are matched with each other, and a convex portion of the drive sub-electrode is embedded in a concave portion of the inductive sub-electrode.

Please refer to the contents described in the embodiments shown in above FIG. 2 and FIG. 3 for details, which will not be repeated here.

In another implementation, the adjacent drive sub-electrodes and the inductive sub-electrodes are nested with each other, and may further include:

the drive sub-electrode and the adjacent inductive sub-electrode each are a spiral structure, and a spiral wall of the drive sub-electrode is embedded in a gap between spiral walls of the inductive sub-electrode.

Please refer to the contents described in the embodiment shown in above FIG. 4 for details, which will not be repeated here.

In the embodiment of the disclosure, the plurality of drive sub-electrodes of each drive electrode may be connected by first electrically conductive bridges, and the plurality of inductive sub-electrodes of each inductive electrode may be connected by second electrically conductive bridges.

Further, the first electrically conductive bridge and the second electrically conductive bridge are insulated from each other.

Further, the drive electrode and the inductive electrode each have a strip-shaped electrode structure and/or a diamond-shaped electrode structure.

Further, the drive sub-electrode and the inductive sub-electrode each have a plurality of mesh units. Please refer to the contents described in the embodiment shown in above FIG. 5 for details, which will not be repeated here.

Further, materials for the drive sub-electrode and the inductive sub-electrode are transparent and electrically conductive oxides or metals.

In the touch display device provided by the embodiment of the disclosure, the drive sub-electrode and the inductive sub-electrode are nested with each other, so that the distance between the inductive electrode and the drive electrode is shortened, and the relative area is increased, and the constant or increased mutual capacitance can be ensured by designing, thereby alleviating the interference by the cathode and achieving a higher touch sensitivity.

The embodiment of the disclosure also provides a touch display device which may include any one of the touch display panels recorded in FIG. 1 to FIG. 12.

A person skilled in the art should understand that although the preferred embodiments of the disclosure have been described, the additional modifications and changes may be made to the embodiments as long as a person skilled in the art knows basic innovative concepts. Therefore, the appended claims are intended to be interpreted as including the preferred embodiments and the modifications and changes falling into the protection scope of the disclosure.

It is apparent that various modifications and changes may be made by a person skilled in the art to the disclosure without departing from the scope of the disclosure. Thus, the disclosure is intended to cover the modifications and changes of the disclosure if the modifications and changes made to the disclosure fall into the protection scope of the claims and the equivalent technology of the disclosure.

What is claimed is:

1. A touch display panel, comprising: a cathode and a plurality of touch electrodes, wherein,
   an interior of at least one touch electrode is hollowed out to reduce a relative area between the touch electrode and the cathode;
   the touch electrodes comprise a plurality of inductive electrodes, and an interior of at least one inductive electrode is hollowed out to reduce a relative area between the inductive electrode and the cathode; each inductive electrode comprises a plurality of sequentially connected inductive sub-electrodes; an interior of one or more inductive sub-electrodes comprised in the at least one inductive electrode is hollowed out;
   the touch electrodes further comprise a plurality of drive electrodes, and an interior of at least one drive electrode is hollowed out to reduce a relative area between the drive electrode and the cathode; each drive electrode comprises a plurality of sequentially connected drive sub-electrodes; an interior of one or more drive sub-electrodes comprised in the at least one drive electrode is hollowed out;
   the plurality of inductive electrodes and the plurality of drive electrodes are intersected with each other, and the adjacent drive sub-electrodes and the inductive sub-electrodes are nested with each other;
   the adjacent drive sub-electrodes and the inductive sub-electrodes are nested with each other, comprising:
   a side of the drive sub-electrode and a side of the adjacent inductive sub-electrode respectively have a spiral structure, and shapes of the spiral structures are matched with each other;
   wherein, the side of the drive sub-electrode has a spiral wall, and the side of the adjacent inductive sub-electrode has a spiral wall; the spiral wall of the drive sub-electrode is spiraled in an angle of 90 degree, and the spiral wall of the adjacent inductive sub-electrode is spiraled in an angle of 90 degree.

2. The touch display panel according to claim 1, wherein, the plurality of inductive electrodes and the plurality of drive electrodes are located in a same electrically conductive layer; or the plurality of inductive electrodes and the plurality of drive electrodes are located in different electrically conductive layers.

3. The touch display panel according to claim 2, wherein, the plurality of inductive electrodes comprise at least one electrode region intersected with the drive electrode, and the electrode region comprises a bridge for connecting the plurality of inductive sub-electrodes.

4. The touch display panel according to claim 1, wherein, the adjacent drive sub-electrodes and the inductive sub-electrodes are nested with each other, comprising:
   a side of the drive sub-electrode and a side of the adjacent inductive sub-electrode respectively have a concave-convex structure, and shapes of the concave-convex structures of the adjacent inductive sub-electrodes are consistent and matched with each other.

5. The touch display panel according to claim 1, wherein, the plurality of inductive sub-electrodes of each inductive electrode are connected by a first electrically conductive bridge;
   the plurality of drive sub-electrodes of each drive electrode are connected by a second electrically conductive bridge.

6. The touch display panel according to claim 5, wherein, the plurality of inductive electrodes and the first electrically conductive bridge are located in the same electrically conductive layer, and the plurality of drive electrodes and the second electrically conductive bridge are located in the same electrically conductive layer;
   wherein, the first electrically conductive bridge and the second electrically conductive bridge are insulated from each other.

7. The touch display panel according to claim 1, wherein, a shape of the inductive electrode comprises at least one of a diamond shape and a strip shape;
   a shape of the drive electrode comprises at least one of a diamond shape and a strip shape.

8. The touch display panel according to claim 1, wherein, the inductive sub-electrode and the drive sub-electrode have a plurality of mesh units.

9. The touch display panel according to claim 1, wherein, the plurality of inductive electrodes and the plurality of drive electrodes are made from transparent electrically conductive materials or metal materials.

10. The touch display panel according to claim 1, wherein, the cathode comprises a plurality of hollow-out area, and the number of the hollow-out areas is same as the number of inductive electrodes; there is one-to-one correspondence between a position of each hollow-out area and a position of each inductive electrode.

11. The touch display panel according to claim 10, wherein, a shape of each hollow-out area is same as a shape of the inductive electrode; and an area of each hollow-out area is equal to an area of the inductive electrode corresponding to the position thereof.

12. The touch display panel according to claim 1, wherein, the cathode comprises a plurality of hollow-out area, a position of each hollow-out area corresponds to a position of an electrode area where the inductive electrode is intersected with the drive electrode.

13. The touch display panel according to claim 12, wherein, a shape of the hollow-out area is same as a shape of the electrode area corresponding to the position of the hollow-out area; an area of the hollow-out area is same as an area of the electrode area corresponding to the position of the hollow-out area.

14. The touch display panel according to claim 12, wherein, the cathode further comprises a hollow-out area whose position corresponds to one of the inductive sub-electrodes.

15. The touch display panel according to claim 1, wherein the spiral wall of the drive sub-electrode comprises a first drive portion extending in a straight line along a first direction, and a second drive portion extending in a straight line along a second direction, wherein, the second drive portion extends from an end of the first drive portion, and the second direction is perpendicular to the first direction;
   the spiral wall of the inductive sub-electrode comprises a first inductive portion extending in a straight line along a third direction, and a second inductive portion extending in a straight line along a fourth direction, wherein, the second inductive portion extends from an end of the first inductive portion, and the fourth direction is perpendicular to the third direction,
   the first drive portion and the first inductive portion extend toward opposite directions, and the second drive portion and the second inductive portion extend toward opposite directions.

16. The touch display panel according to claim 15, wherein the spiral wall of the drive sub-electrode comprises at least one set of drive wall portions, each set of drive wall portions comprises the first drive portion and the second drive portion;
   the spiral wall of the inductive sub-electrode comprises at least one set of inductive wall portions, each set of inductive wall portions comprises the first inductive portion and the second inductive portion;
   the inductive wall portions are nested into gaps formed by the drive wall portions, and the drive wall portions are nested into gaps formed by the inductive wall portions.

17. The touch display panel according to claim 15, the spiral wall of the drive sub-electrode further comprises a third drive portion extending from an end of the second drive portion, a fourth drive portion extending from an end of the third drive portion, a fifth drive portion extending from an end of the fourth drive portion and a sixth drive portion extending from an end of the fifth drive portion;
   wherein, each of the third drive portion, the fourth drive portion, the fifth drive portion and the sixth drive portion extends in a straight line, the third drive portion and the fifth drive portion extend along the first direction, the fourth drive portion and the sixth drive portion extend along the second direction;
   the spiral wall of the inductive sub-electrode further comprises a third inductive portion extending from an end of the second inductive portion, a fourth inductive portion extending from an end of the third inductive portion, a fifth inductive portion extending from an end of the fourth inductive portion and a sixth inductive portion extending from an end of the fifth inductive portion;
   wherein, each of the third inductive portion, the fourth inductive portion, the fifth inductive portion and the sixth inductive portion extends in a straight line, the third inductive portion and the fifth inductive portion extend along the first direction, the fourth inductive portion and the sixth inductive portion extend along the second direction.

18. A touch display panel, comprising: a drive electrode and an inductive electrode intersected with the drive electrode, wherein;
   the drive electrode comprises a plurality of mutually independent drive sub-electrodes, and the inductive electrode comprises a plurality of mutually independent touch inductive sub-electrodes;
   the adjacent drive sub-electrodes and the inductive sub-electrodes are nested with each other;
   wherein, the adjacent drive sub-electrodes and the inductive sub-electrodes are nested with each other, comprising:
   the drive sub-electrode and the adjacent inductive sub-electrode respectively have a spiral structure, and a spiral wall of the spiral structure of the drive sub-electrode is embedded in a gap between spiral walls of the spiral structure of the inductive sub-electrode;
   wherein, the side of the drive sub-electrode has a spiral wall, and the side of the adjacent inductive sub-electrode has a spiral wall; the spiral wall of the drive sub-electrode is spiraled in an angle of 90 degree, and the spiral wall of the adjacent inductive sub-electrode is spiraled in an angle of 90 degree.

19. The touch display panel according to claim 18, wherein, the adjacent drive sub-electrodes and the inductive sub-electrodes are nested with each other, comprising:
   a side of the drive sub-electrode and a side of the adjacent inductive sub-electrode respectively have a concave-convex structure, the concave-convex structure of the drive sub-electrode and the concave-convex structure of the adjacent inductive sub-electrode are matched with each other.

20. A touch display device, comprising: the touch display panel having a cathode and a plurality of touch electrodes, and an interior of at least one touch electrode being hollowed out to reduce a relative area between the touch electrode and the cathode;
   the touch electrodes comprise a plurality of inductive electrodes, and an interior of at least one inductive electrode is hollowed out to reduce a relative area between the inductive electrode and the cathode; each inductive electrode comprises a plurality of sequentially connected inductive sub-electrodes; an interior of one or more inductive sub-electrodes comprised in the at least one inductive electrode is hollowed out;
   the touch electrodes further comprise a plurality of drive electrodes, and an interior of at least one drive electrode is hollowed out to reduce a relative area between the drive electrode and the cathode; each drive electrode comprises a plurality of sequentially connected drive sub-electrodes; an interior of one or more drive sub-electrodes comprised in the at least one drive electrode is hollowed out;
   the plurality of inductive electrodes and the plurality of drive electrodes are intersected with each other, and the adjacent drive sub-electrodes and the inductive sub-electrodes are nested with each other;
   the adjacent drive sub-electrodes and the inductive sub-electrodes are nested with each other, comprising:
   a side of the drive sub-electrode and a side of the adjacent inductive sub-electrode respectively have a spiral structure, and shapes of the spiral structures of the adjacent inductive sub-electrodes are consistent and matched with each other;
   wherein, the side of the drive sub-electrode has a spiral wall, and the side of the adjacent inductive sub-electrode has a spiral wall; the spiral wall of the drive sub-electrode is spiraled in an angle of 90 degree, and the spiral wall of the adjacent inductive sub-electrode is spiraled in an angle of 90 degree;
   or the touch display panel having a drive electrode and an inductive electrode intersected with the drive electrode, the drive electrode comprising a plurality of mutually independent drive sub-electrodes and the inductive electrode comprising a plurality of mutually independent touch inductive sub-electrodes, the adjacent drive sub-electrodes and the inductive sub-electrodes are nested with each other; wherein, the adjacent drive sub-electrodes and the inductive sub-electrodes are nested with each other, comprising:

the drive sub-electrode and the adjacent inductive sub-electrode respectively have a spiral structure, and a spiral wall of the spiral structure of the drive sub-electrode is embedded in a gap between spiral walls of the spiral structure of the inductive sub-electrode;

wherein, the side of the drive sub-electrode has a spiral wall, and the side of the adjacent inductive sub-electrode has a spiral wall; the spiral wall of the drive sub-electrode is spiraled in an angle of 90 degree, and the spiral wall of the adjacent inductive sub-electrode is spiraled in an angle of 90 degree.

* * * * *